US008283816B2

(12) United States Patent
Ohashi et al.

(10) Patent No.: US 8,283,816 B2
(45) Date of Patent: Oct. 9, 2012

(54) SUPERCONDUCTING APPARATUS AND VACUUM CONTAINER FOR THE SAME

(75) Inventors: Yoshimasa Ohashi, Kariya (JP); Nobuo Okumura, Toyota (JP); Hidetoshi Kusumi, Nagoya (JP)

(73) Assignees: Aisin Seiki Kabushiki Kaisha, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 525 days.

(21) Appl. No.: 12/640,535

(22) Filed: Dec. 17, 2009

(65) Prior Publication Data

US 2010/0148593 A1    Jun. 17, 2010

(30) Foreign Application Priority Data

Dec. 17, 2008  (JP) ................... 2008-320762

(51) Int. Cl.
*H02K 9/00* (2006.01)
(52) U.S. Cl. .......................................................... 310/52
(58) Field of Classification Search .............. 310/52, 310/88, 89; 505/163; 62/47.1
See application file for complete search history.

(56) References Cited

U.S. PATENT DOCUMENTS 5,030,863 A * 7/1991 Yoshimura et al. ............ 310/52
5,584,184 A * 12/1996 Inaguchi et al. ............... 62/6
2004/0017117 A1* 1/2004 Kwon et al. ................. 310/61
2011/0160064 A1* 6/2011 Pfleiderer et al. .......... 505/163

FOREIGN PATENT DOCUMENTS

| JP | 61-49465 U | 4/1986 |
| JP | 62-165901 | 7/1987 |
| JP | 2007-89345 | 4/2007 |

OTHER PUBLICATIONS

Office Action issued May 2, 2011, in Japan patent Application No. 2008-320762 (with English translation).

* cited by examiner

*Primary Examiner* — Nguyen N Hanh
(74) *Attorney, Agent, or Firm* — Oblon, Spivak, McClelland, Maier & Neustadt, L.L.P.

(57) ABSTRACT

A vacuum container for housing therein a superconducting apparatus includes first and second partition walls made of magnetic-permeable nonmetallic materials, respectively, and facing each other to form a vacuum heat insulation chamber that is adapted to cover a superconductor that generates a magnetic flux. The first and second partition walls are exposed to relatively higher and lower temperatures, respectively. The first partition wall includes a radiation surface emitting thermal radiation while the second partition wall includes an absorption surface absorbing the thermal radiation. One of the radiation surface and the absorption surface is provided with a metal layer group in an exposed manner relative to the other of the radiation surface and the absorption surface. The metal layer group includes a plurality of metal layers spaced apart from one another and the nonmetallic material appears between the plurality of metal layers.

7 Claims, 10 Drawing Sheets

US 8,283,816 B2

SUPERCONDUCTING APPARATUS AND VACUUM CONTAINER FOR THE SAME

CROSS REFERENCE TO RELATED APPLICATIONS

This application is based on and claims priority under 35 U.S.C. §119 to Japanese Patent Application 2008-320762, filed on Dec. 17, 2008, the entire content of which is incorporated herein by reference.

TECHNICAL FIELD

This disclosure relates to a superconducting apparatus and a vacuum container for the same.

BACKGROUND DISCUSSION

A known superconducting apparatus includes a superconducting coil generating a magnetic flux when an electric power is supplied to the superconducting coil. In particular, a superconducting apparatus disclosed in JP2007-89345A (hereinafter referred to as Patent Document 1) includes a vacuum container forming a vacuum heat insulation chamber accommodating a superconducting coil. When an electric power is supplied to the superconducting coil, the superconducting coil generates a magnetic flux. The generated magnetic flux penetrates through the vacuum container. In this case, when the magnetic flux varies, an eddy current occurs in accordance with the electromagnetic induction and flows through the vacuum container in a direction that the variations of the magnetic flux are prevented. Accordingly, the vacuum container may be heated. In order to prevent the vacuum container from being heated, the vacuum container is made of a nonmetallic material such as a resin, a composite resin reinforced by a reinforcing material, and ceramic, which are having a high electric resistance. For example, the reinforcing material is a glass fiber and the ceramic is an alumina material.

According to the superconducting apparatus disclosed in Patent Document 1, heating of the vacuum container by the eddy current is prevented. However, since a base material of the vacuum container is formed by the above-mentioned nonmetallic material, heat due to thermal radiation may be transmitted to the vacuum container. This is because emissivity and absorption of the nonmetallic material due to thermal radiation do not largely differ from those of a metal material under a condition where an electromagnetic wave generated by the variations of the magnetic flux is within a visible wavelength range. Meanwhile, the emissivity and absorption of the nonmetallic material is extremely larger than those of the metal material under a condition where the electromagnetic wave is in an infrared wavelength range.

In particular, in the case of the vacuum container accommodating the superconducting coil, a temperature difference between a heat radiation side, which is at high temperatures, and a heat absorption side, which is at low temperatures, is very large. In general, emissivity and absorption of thermal radiation is basically proportional to a difference between the forth power of the absolute temperature of an object at high temperatures and the fourth power of the absolute temperature of an object at low temperatures. Accordingly, the superconducting coil tends to be heated under the influence of such emissivity and absorption.

A need thus exists for a superconducting apparatus and a vacuum container for the same, which are not susceptible to the drawback mentioned above.

SUMMARY

According to an aspect of this disclosure, a vacuum container for housing therein a superconducting apparatus including first and second partition walls made of magnetic-permeable nonmetallic materials, respectively, and facing each other to form a vacuum heat insulation chamber that is adapted to cover a superconductor that generates a magnetic flux, the first and second partition walls being exposed to relatively higher and lower temperatures, respectively, the first partition wall including a radiation surface emitting thermal radiation, the second partition wall including an absorption surface absorbing the thermal radiation, wherein one of the radiation surface of the first partition wall and the absorption surface of the second partition wall is provided with a metal layer group in an exposed manner relative to the other of the radiation surface of the first partition wall and the absorption surface of the second partition wall, and the metal layer group includes a plurality of metal layers spaced apart from one another and the nonmetallic material appears between the plurality of metal layers.

According to an another aspect of the disclosure, a superconducting apparatus includes a magnetic field generating portion including a superconductor that generates a magnetic flux and a permeable core that allows penetration of the magnetic flux generated by the superconductor; and a vacuum container including first and second partition walls made of magnetic-permeable nonmetallic materials, respectively, and facing each other to form a vacuum heat insulation chamber that is adapted to cover the superconductor, the first and second partition walls being exposed to relatively higher and lower temperatures, respectively, the first partition wall including a radiation surface emitting thermal radiation, the second partition wall including an absorption surface absorbing thermal radiation, wherein one of the radiation surface of the first partition wall and the absorption surface of the second partition wall is provided with a metal layer group in an exposed manner relative to the other of the radiation surface of the first partition wall and the absorption surface of the second partition wall, and the metal layer group includes a plurality of metal layers spaced apart from one another and the nonmetallic material appears between the plurality of metal layers.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
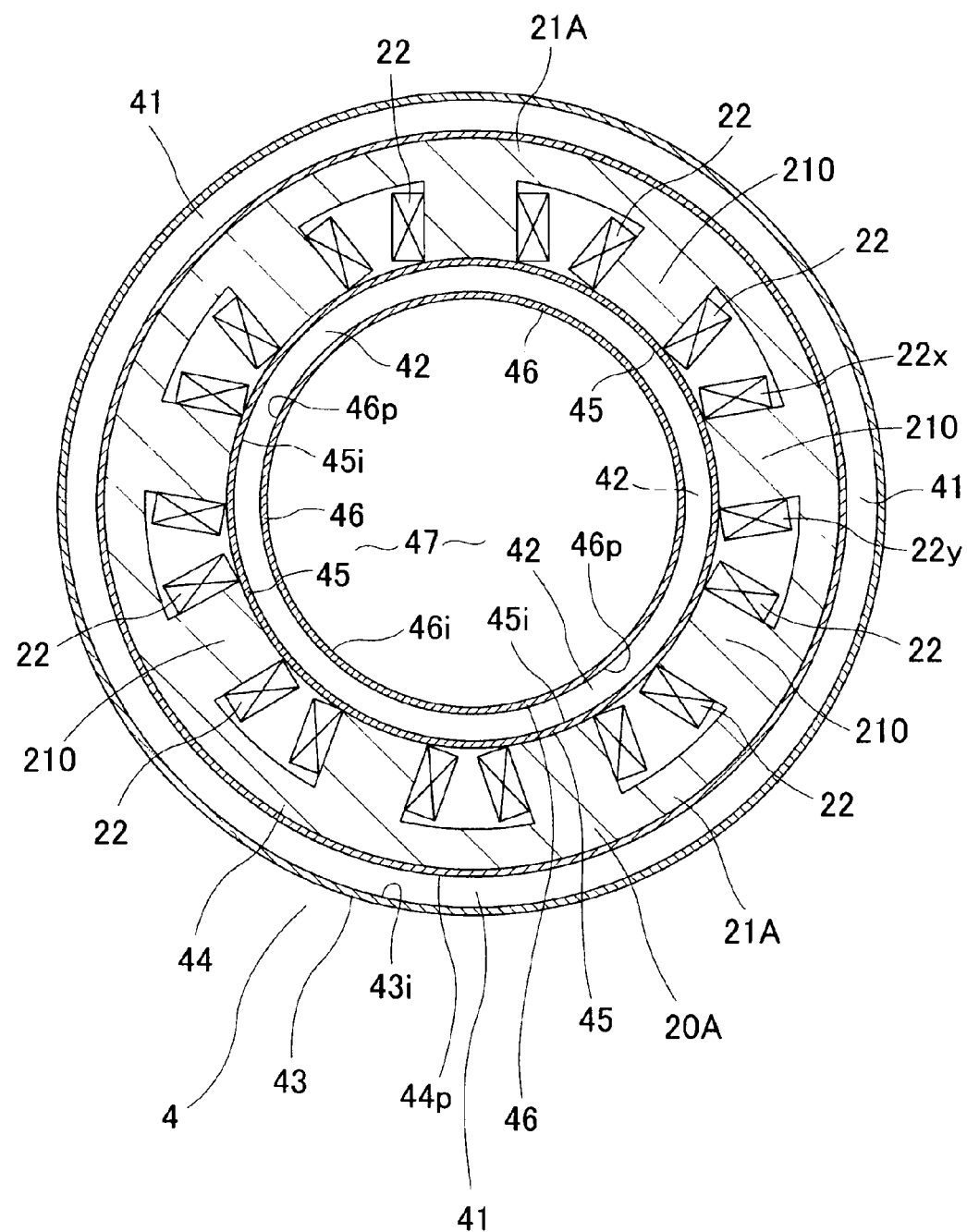
FIG. 1 is a cross-sectional view of a superconducting apparatus according to a first embodiment disclosed here.
Figure 2:
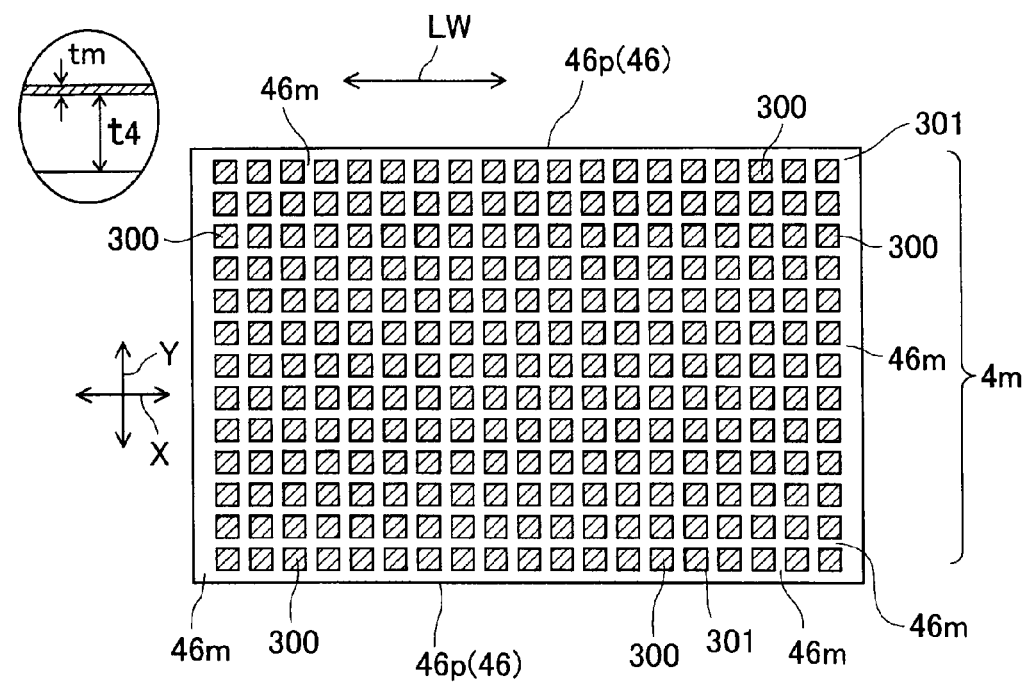
FIG. 2 is a developed view schematically showing a radiation surface according to the first embodiment disclosed here.

FIG. 1 and FIG. 2 are schematic diagrams showing a superconducting apparatus according to a first embodiment. As shown in FIG. 1, the superconducting apparatus includes a vacuum container 4 having a first container 43, a second container 44 contained in the first container 43, a third container (second partition wall) 45 contained in the second container 44, and a fourth container (first partition wall) 46 contained in the third container 45 in order from a radially outer side to a radially inner side. The first to fourth containers 43 to 46 are coaxially arranged with one another. A superconducting mechanism 20A is accommodated in a chamber defined between the second container 44 and the third container 45. The superconducting mechanism 20A includes a permeable core 21A and a superconducting coil (superconductor) 22 wound on the permeable core 21A and formed by a superconducting material. The permeable core 21A serves as a cylindrical-shaped yoke made of a material having a high magnetic permeability (for example, iron material). The permeable core 21A includes a plurality of teeth portions 210 protruding in a radially inward direction of the permeable core 21A. The superconducting coil 22 is wound on each of the teeth portions 210. The teeth portion 210 is arranged between a coil 22x and a coil 22y of the superconducting coil 22 wound on the teeth portion 210. Electric currents passing through the coil 22x and the coil 22y flow in different directions from each other. An inner circumferential surface 43i of the first container 43 and an outer circumferential surface 44p of the second container 44 define an outer vacuum heat insulation chamber 41 by which the superconducting coil 22 is kept in a superconductive state.

As shown in FIG. 1, an inner circumferential surface of the third container 45 and an outer circumferential surface of the fourth container 46 form an inner vacuum heat insulation chamber 42 by which the superconducting coil 22 is kept in an superconductive state. The inner circumferential surface of the third container 45 serves as an absorption surface 45i absorbing thermal radiation and the outer circumferential surface of the fourth container 46 serves as a radiation surface 46p emitting thermal radiation. The outer vacuum heat insulation chamber 41 and the inner vacuum heat insulation chamber 42 enhance thermal insulation properties of the superconducting coil 22. The third container (second partition wall) 45 and the fourth container (first partition wall) 46 are formed by base materials of nonmetallic materials such as resin, composite resin, and ceramic and thus reduce eddy current losses. A thermosetting resin or a thermoplastic resin is applied as the resin. Known resin materials such as epoxy, phenol, polystyrene, saturated polyester, polyamide, polyacetal, polycarbonate, polyphenylenether, polybutylene terephthalate, polyarylate, polysulfone, polyimide resins are applied as the resin. A reinforced resin for a reinforcing material is applied to the composite resin. The reinforcing material is glass, ceramic, carbon fibers, and grains. The ceramic includes oxide-based, silicon-based, and boride-based ceramic, specifically, alumina, silica, titania, magnesia, zirconia, silicon nitride, silicon carbide, mullite, boron nitrade, and aluminum titanate ceramic.

An inner void 47 defined by an inner circumferential surface 46i of the fourth container 46 is connected to an outer atmosphere. Accordingly, the fourth container (first partition wall positioned at a high temperature side) 46 is exposed to a temperature higher than that of the third container 45 in the vacuum container 4. Meanwhile, the third container (second partition wall at a low temperature side) 45 is exposed to a temperature lower than that of the fourth container 46 in the vacuum container 4 because the third container 45 is provided adjacent to the superconducting coil 22 maintained under extremely low temperatures. The radiation surface 46p of the fourth container 46 at the high temperature side faces the absorption surface 45i of the third container 45 at the low temperature side in a condition where the inner vacuum heat insulation chamber 42 is provided therebetween. Under this condition, it is appropriate to shield thermal radiation emitted from the fourth container 46 to the third container 45 as much as possible in order to maintain the superconducting coil 22 in a low temperature state.

Figure 3:
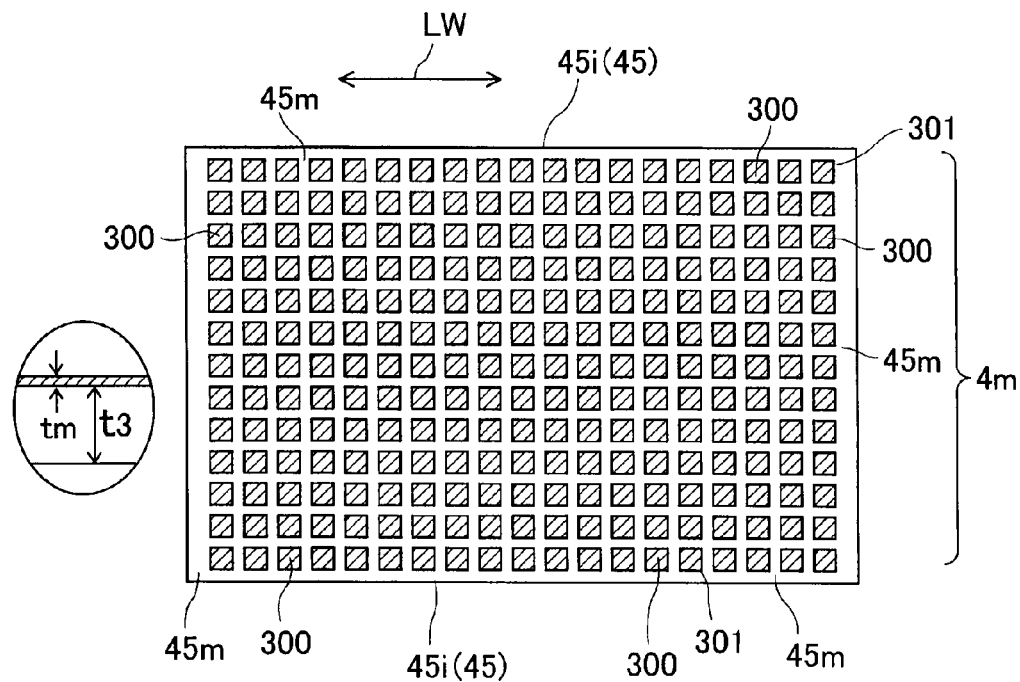
FIG. 3 is a developed view schematically showing an absorption surface according to the first embodiment disclosed here.

FIG. 2 is a developed view schematically showing the radiation surface 46p that is the outer surface of the fourth container (first partition wall at the high temperature side) 46. An arrow LW indicates a circumferential direction of the fourth container 46. As shown in FIG. 2, the radiation surface 46p of the fourth container 46 includes a magnetic flux transmission area 4m. A metal layer group 301 is laminated to the radiation surface 46p of the fourth container 46 so as to include multiple metal layer s 300 forming quadrangles, divided from one another, and arranged side by side at intervals vertically and horizontally in the magnetic flux transmission area 4m. The metal layers 300 adjacent to one another are divided from one another and not in contact with one another. In particular, the multiple metal layers 300 forming the metal layer group 301 are divided by the base material (which forms a base material portion 46m) of the radiation surface 46p in a grid pattern and exposed on the radiation surface 46p. That is, the metal layers 300 are finely divided in an X direction (circumferential direction of the fourth container 46) and a Y direction (vertical direction of the fourth container 46) and arranged in the grid pattern on the radiation surface 46. The nonmetallic base material forming the base material portion 46m and configuring the fourth container 46 forms a grid pattern on the radiation surface 46. The base material portion 46m is exposed between the metal layers 300 adjacent to one another on the radiation surface 46. FIG. 3 is a developed view schematically showing the absorption surface 45i of the third container 45. An arrow LW indicates a circumferential direction of the third container 45. As illustrated in FIG. 3, the absorption surface 45i includes the magnetic flux transmission area 4m. The metal layer group 301 is laminated in the magnetic flux transmission area 4m on the absorption surface 45i of the third container 45.

As shown in FIG. 3, the metal layer group 301 is laminated to the absorption surface 45i of the third container 45 so as to include the multiple metal layers 300 divided from one another and arranged side by side at intervals. In particular, the multiple metal layers 300 forming the metal layer group 301 is finely divided by a base material portion 45m (base material) of the absorption surface 45i in a grid pattern and exposed on the absorption surface 45i. That is, the metal layers 300 are divided in an X direction (circumferential direction of the third container 45) and a Y direction (vertical direction of the third container 45) and arranged side by side in the grid pattern. Accordingly, the base material forming the base material portion 45m made of the nonmetallic material and configuring the third container 45 forms a grid pattern on the absorption surface 45i. The base material portion 45m is exposed between the metal layers 300 adjacent to one another on the absorption surface 45i. In addition, a projected shape of each of the metal layers 300 is the quadrangle but not is limited to the quadrangle. The projected area of the metal layer 300 may be a polygonal shape such as rhombic, triangular, pentagonal shapes or a circular shape such as annular, elliptical, and ring shapes and may be a letter, a number, a symbol, or the like.

One of the metal layers 300 forming the metal layer group 301 is appropriately formed by either one of a thin metallic film, a metallic foil, a metal tape, a metal film, a metallic strip, and a metal mesh body. The thin metallic film is formed by a physical coating process or a chemical coating process. The physical coating process includes a rolling process, a pressure bonding process, a vacuum deposition process, a sputtering process, and an ion plating process depending on the size of the interval between the metal layers 300, and more specifically, a dry etching process (for example, plasma etching, reactive ion etching, and sputtering etching processes) applied after a metal layer is formed. Meanwhile, the chemical coating process includes a CVD (chemical vapor deposition) process, a printing process such as a screen printing process, and more specifically, a wet etching process applied after a metal layer is formed. In cases of such film forming process, the radiation surface 46p and the absorption surface 45i may be covered by masking devices, each having openings, according to need. Films are formed on the radiation surface 46p and the absorption surface 45i by metal that passed through the openings of the masking devices, thereby forming the metal layers 300. Films are not formed on portions of the radiation surface 46p and the absorption surface 45i that are covered by the masking devices. Accordingly, the metal layers 300 are not formed on such portions of the radiation surface 46p and the absorption surface 45i. Consequently, the base material portions 46m, 45m are exposed on the radiation surface 46p and the absorption surface 45i.

In cases where either one of the metallic foil, the metal tape, the metal film, and the metal strip is applied to form the metal layers 300, each may be attached to the radiation surface 46p and the absorption surface 45i with adhesive or by means of the pressure bonding process. Here, when a thickness of the base material of the third container 45 is t3 and a thickness of each of the metal layers 300 laminated on the third container 45 is tm (see FIG. 3), a ratio of tm relative to t3 may be set within a range of 0.0001 to 0.1, 0.001 to 0.1, or 0.01 to 0.1. Meanwhile, when a thickness of the base material of the fourth container 46 is t4 and a thickness of each of the metal layers 300 laminated on the fourth container 46 is tm (see FIG. 2), a ratio of tm relative to t4 may be set within a range of 0.0001 to 0.1, 0.001 to 0.1, or 0.01 to 0.1. In addition, the value tm may range from 0.1 micrometer to 5 millimeters, from 0.3 micrometer to 1,000 micrometers, from 1 micrometer to 500 micrometers, from 2 micrometers to 200 micrometers, or the like; however, the value tm is not limited to such ranges. The value tm depends on the size, thickness, and usage of each vacuum container and on manufacturing methods of the metal layer 300.

When the thickness of each of the metal layers 300 is small, an electric resistance of the radiation surface 46p and/or the absorption surface 45i increases and an eddy current is not easily generated thereon. A rolled metal sheet and an amorphous metal sheet, the magnetic permeability of which is increased, may be applied to the metal tape, the metal film, and the metal strip. A material having a high electric resistance and a high magnetic permeability is appropriate as a metal configuring the metal layer 300. The metal includes a transition metal and the transition metal alloy such as copper, copper alloy, aluminum, aluminum alloy, iron, iron alloy, silver, silver alloy, gold, gold alloy, zinc, zinc alloy, tin, tin alloy, titanium, titanium alloy, magnesium, and magnesium alloy; however, the metal applied to the metal layer 300 is not limited to such metals. Further, it is appropriate that a metal having a high electric resistance is applied in order to reduce the occurrence of an eddy current. Furthermore, it is appropriate that a metal having a high magnetic permeability is used in order to secure a magnetic flux permeability.

When an electric power is supplied to the superconducting coil 22, the superconducting coil 22 generates a magnetic flux. For example, in a case where the entire base materials of the fourth container 46 (at the high temperature side) and the third container 45 (at the low temperature side) are made of metal, the magnetic flux varies and a large eddy current loop is generated in accordance with the variations of the magnetic flux. As a result, a possibility of heating of the fourth container 46 and the third container 45 due to the Joule heat generated by the eddy current is further increased. Such situation causes heating of the superconducting coil 22 and therefore is undesirable to obtain a superconducting state of the superconducting coil 22. Thus, according to the first embodiment, the non-metallic materials are used for the base materials of the fourth container 46 and the third container 45. However, in such case, emissivity and absorption of thermal radiation of the fourth container 46 and the third container 45 increase. Accordingly, such case is not appropriate to generate an extremely low temperature state of the superconducting coil 22. This is because emissivity of infrared rays emitted from a nonmetallic material such as composite resin reinforced by a reinforcing material (for example, a glass fiber), resin, and ceramic is extremely higher than emissivity of infrared rays emitted from metal as described above. For example, according to references, the emissivity of the metal is 0.1 or lower while the emissivity of the nonmetallic material ranges from 0.6 to 1.0. Accordingly, it is desirable to reduce the emissivity of thermal radiation of the radiation surface 46p of the fourth container 46 positioned at the high temperature side. Similarly, it is appropriate to reduce the absorption of thermal radiation of the absorption surface 45i of the third container 45 positioned at the low temperature side. In addition, although the entire fourth container 46 and the entire third container 45 are formed by the nonmetallic materials in the first embodiment, a small amount of metal in less than or equal to five percent by mass or in less than or equal to three percent by mass may be included in each nonmetallic material such as resin, glass, and ceramic as long as the amount does not affect basic performances of the fourth container 46 and the third containers 45.

As descried above, according to the first embodiment, the metal layer group 301 is formed on the radiation surface 46p of the fourth container 46 so as to include the multiple metal layers 300 divided from one another in the grid pattern, spaced apart from one another, and arranged side by side in the magnetic flux transmission area 4m. Accordingly, an area ratio of the nonmetallic material having high emissivity of thermal radiation in the radiation surface 46p is decreased and an area ratio of the metal layers 300 having relatively lower emissivity of thermal radiation than that of the nonmetallic material in the radiation surface 46p is increased. As a result, the emissivity of thermal radiation of the radiation surface 46p is decreased. Consequently, an effect of heat on the superconducting coil 22 of the superconducting apparatus is reduced.

Similarly, according to the first embodiment, the metal layer group 301 is formed on the absorption surface 45i of the third container 45 so as to include the multiple metal layers 300 divided from one another in the grid pattern, spaced apart from one another, and arranged side by side in the magnetic flux transmission area 4m. Accordingly, an area ratio of the nonmetallic material having high absorption of thermal radiation in the absorption surface 45i is decreased and an area ratio of the metal layers 300 having relatively lower absorption of thermal radiation than that of the nonmetallic material in the absorption surface 45i is increased. As a result, the absorption of thermal radiation of the absorption surface 45i is decreased. Consequently, even when the fourth container 46 is under high temperatures, an effect of heat on the superconducting coil 22 of the superconducting apparatus is reduced, therefore maintaining the superconducting coil 22 in the extremely low temperature state.

As described above, when an electric power is supplied to the superconducting coil 22, the superconducting coil 22 generates a magnetic flux. Then, when the magnetic flux varies, an eddy current is generated and an eddy current loop occurs on the metal layer group 301. The metal layers 300 configuring the metal layer group 301 are finely divided from one another and arranged in the grid pattern. That is, the nonmetallic base materials serving as the base material portions 45m, 46m and forming the third container 45 and the fourth container 46 are exposed between the metal layers 300 adjacent to one another, therefore fairly reducing an exposed area of the metal forming the metal layer group 301. Accordingly, even when the eddy current loop occurs on the metal layer group 301 due to the variations of the magnetic flux, the eddy current loop is further minimized, compared to a case where the entire third container 45 and the entire fourth container 46 are made of metal. Consequently, the generation of the Joule heat is prevented, therefore preventing the third container 45 and the fourth container 46 from being heated. Thus the superconducting coil 22 is maintained in the extremely low temperature state. Further, eddy current losses are reduced and the output of the superconducting coil 22 is effectively increased.

A second embodiment will be explained with reference to FIG. 1 because a configuration and operational effects of the second embodiment are basically similar to those of the first embodiment. As described above, the metal layer group 301 is formed on the radiation surface 46p of the fourth container 46 so as to include the multiple metal layers 300 divided from one another and arranged side by side at intervals. Meanwhile, according to the second embodiment, the metal layer group 301 is not formed on the absorption surface 45i of the third container 45 positioned at the low temperature side and the nonmetallic material that is the base material of the third container 45 is exposed on the absorption surface 45i. In this case, although an absorption prevention effect of the absorption surface 45i is reduced, eddy current losses at the third container 45 are reduced.

A third embodiment will be explained with reference to FIG. 1 because a configuration and operational effects according to the third embodiment are basically similar to those of the first embodiment. As described above, the metal layer group 301 is formed on the absorption surface 45i of the third container 45 and formed so as to have the multiple metal layers 300 divided from one another and arranged side by side at intervals. Meanwhile, according to the third embodiment, the metal layer group 301 is not formed on the radiation surface 46p of the fourth container 46 positioned at the high temperature side and the nonmetallic material serving as the base material of the fourth container 46 is exposed on the radiation surface 46p. In this case, although an emissivity prevention effect of the radiation surface 46p is reduced, eddy current losses at the fourth container 46 are reduced.

Figure 4:
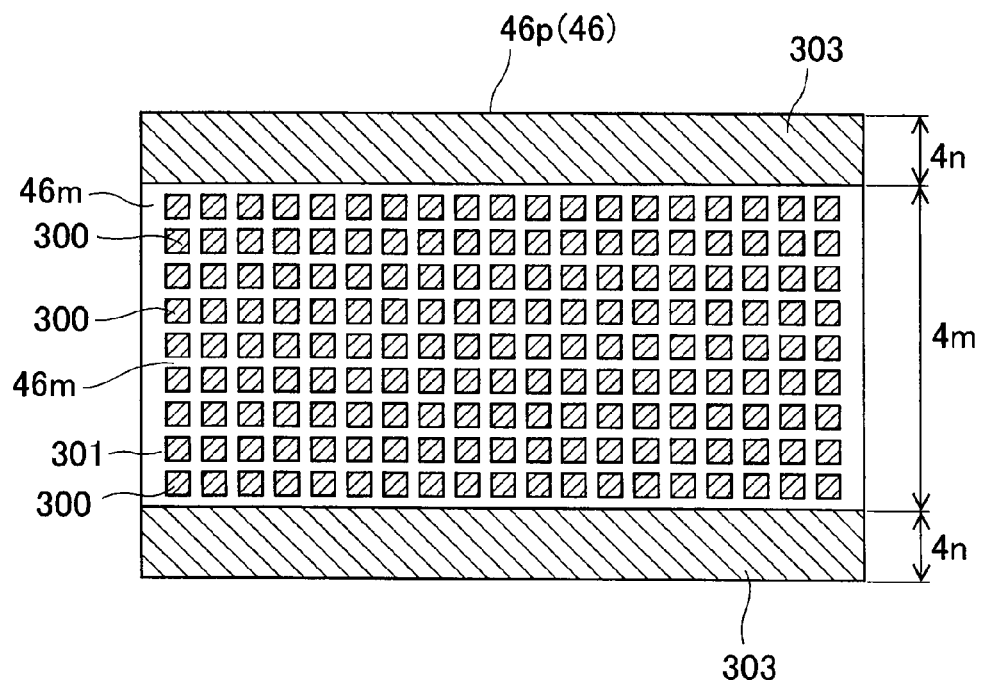
FIG. 4 is a developed view schematically showing the radiation surface according to a fourth embodiment disclosed here.
Figure 5:
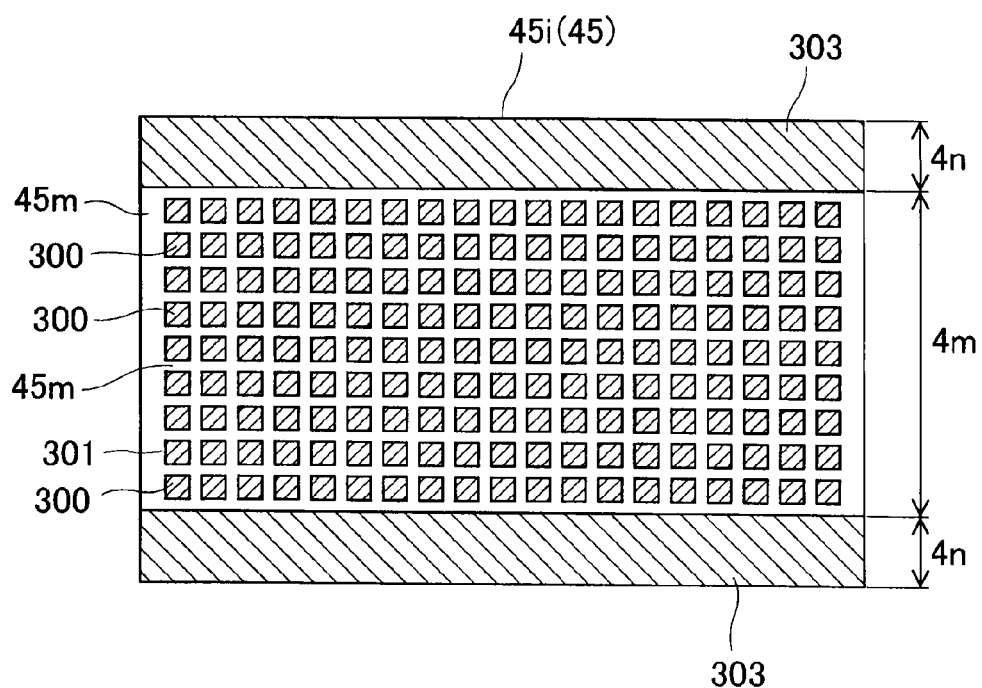
FIG. 5 is a developed view schematically showing the absorption surface according to the fourth embodiment disclosed here.

FIG. 4 and FIG. 5 show a fourth embodiment. A configuration and operating effects of the fourth embodiment are similar to those of the first embodiment. FIG. 4 is a developed view schematically showing the radiation surface 46p of the fourth container 46. The metal layer group 301 is formed and exposed on the radiation surface 46p of the fourth container 46 so as to include the multiple metal layers 300 divided from one another in the grid pattern and arranged side by side at intervals vertically and horizontally in the magnetic flux transmission area 4m. Accordingly, the base material portion 46m of the radiation surface 46p of the fourth container 46 is exposed in the magnetic flux transmission area 4m so as to form the grid (mesh) pattern.

As shown in FIG. 4, the fourth container 46 includes flux non-transmission areas 4n on the radiation surface 46p. A magnetic flux does not substantively penetrate through the flux non-transmission areas 4n. The generation of an eddy current in accordance with variations of a magnetic flux is prevented in the flux non-transmission areas 4n. Accordingly, continuous metal layers 303 are laminated to the flux non-transmission areas 4n so that the base material of the fourth container 46 is not exposed on the radiation surface 46p, in order to reduce emissivity of thermal radiation as much as possible. Consequently, emissivity of thermal radiation in the flux non-transmission area 4n is minimized. FIG. 5 shows a developed view schematically showing the absorption surface 45i of the third container 45. The metal layer group 301 is formed and exposed on the absorption surface 45i of the third container 45 so as to include the multiple metal layers 300 divided from one another in the grid pattern and arranged side by side at intervals vertically and horizontally in the magnetic flux transmission area 4m. Accordingly, the base material portion 45m of the absorption surface 45i of the third container 45 is exposed in the magnetic flux transmission area 4m so as to form the grid (mesh) pattern. As shown in FIG. 5, the third container 45 includes the flux non-transmission areas 4n on the absorption surface 45i. A magnetic flux does not substantively penetrate through the flux non-transmission areas 4n. The generation of an eddy current in accordance with variations of a magnetic flux is prevented in the flux non-transmission areas 4n. Accordingly, the continuous metal layers 303 are laminated to the flux non-transmission areas 4n so that the base material of the third container 45 is not exposed on the absorption surface 45i in order to reduce absorption of thermal radiation as much as possible. Consequently, absorption of thermal radiation in the flux non-transmission areas 4n is minimized.

Figure 6:
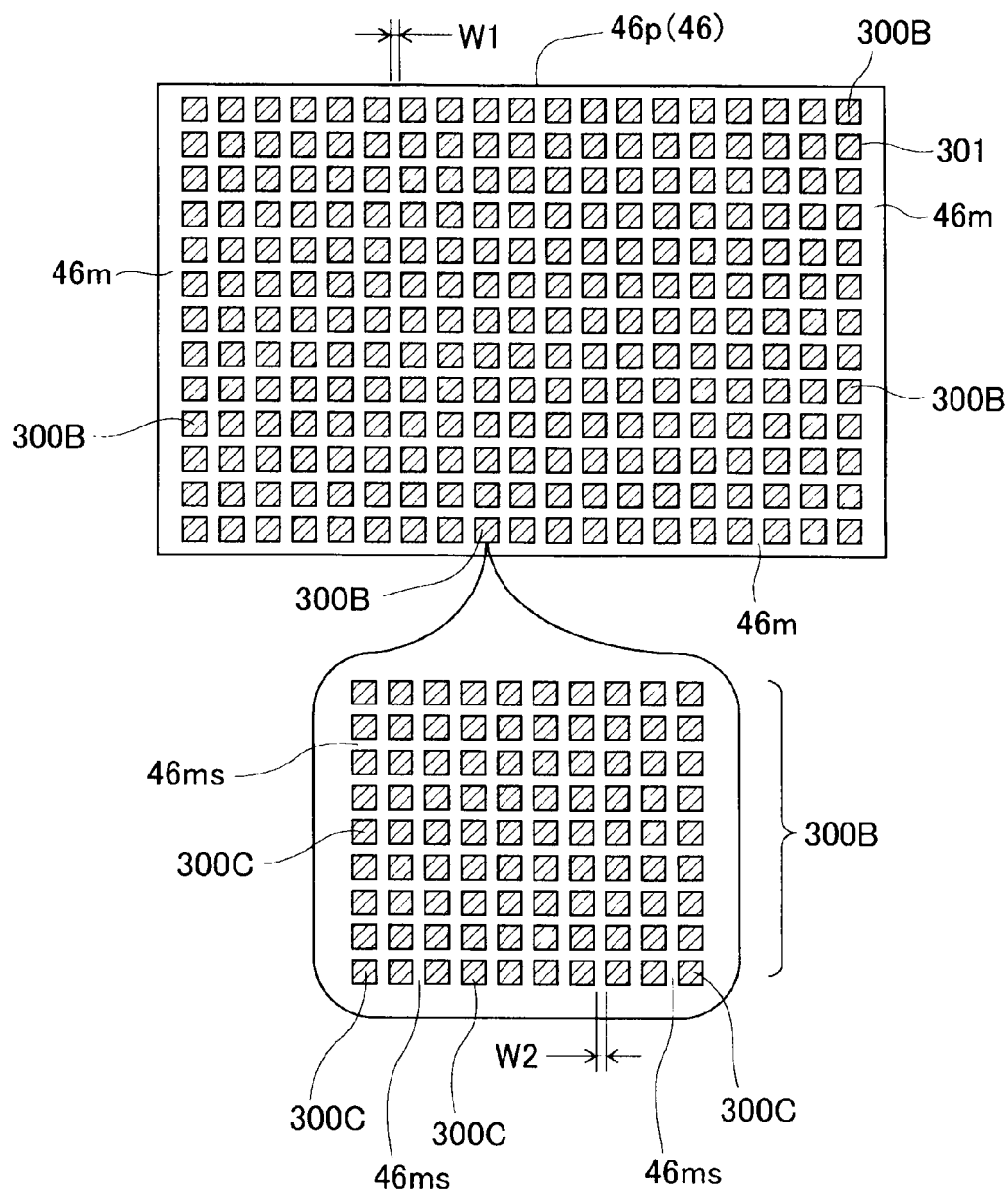
FIG. 6 is a partial developed view schematically showing the radiation surface and/or the absorption surface according to a fifth embodiment disclosed here.

FIG. 6 shows a fifth embodiment. FIG. 6 is a developed view schematically showing the radiation surface 46p. As shown in FIG. 6, the metal layer group 301 includes multiple first subsidiary metal layers 300B laminated to the radiation surface 46p. The first subsidiary metal layers 300B are arranged side by side at intervals. The base material portion 46m made of the nonmetallic material (resin, fiber-reinforced resin, and ceramic) forming the fourth container 46 are exposed in the grid pattern between the first subsidiary metal layers 300B adjacent to one another on the radiation surface 46p. Further, each of the first subsidiary metal layers 300B includes multiple second subsidiary metal layers 300C arranged side by side at intervals vertically and horizontally. A base material portion 46ms made of the nonmetallic material (resin, fiber-reinforced resin, and ceramic) forming the fourth container 46 is exposed in a grid pattern between the second subsidiary metal layers 300C adjacent to one another on the radiation surface 46p.

As described above, when an electric power is supplied to the superconducting coil 22, the superconducting coil 22 generates a magnetic flux. Then, when the magnetic flux varies, an eddy current is generated and an eddy current loop occurs on the metal layer group 301 in a direction perpendicular to the magnetic flux. According to the fifth embodiment, the first subsidiary metal layers 300B forming the metal layer group 301 are finely divided in a mesh pattern by the base material portion 46m of the nonmetallic material exposed on the radiation surface 46p. Further, each of the first subsidiary metal layers 300B includes the second subsidiary metal layers 300C divided from one another and arranged side by side vertically and horizontally as well as the base material portion 46ms. In addition, a width W2 of each of the base material portion 46ms is shorter than a width W1 of each of the base material portion 46m. According to the fifth embodiment, the base material portions 46m, 46ms form the grid patterns but may not be limited to such grid patterns. The base material portions 46m, 46ms may be arranged in a radial pattern or may be arranged vertically. Further, the first subsidiary metal layers 300B are arranged vertically and horizontally on the radiation surface 46p but may be arranged in a zigzag pattern. Furthermore, the second subsidiary metal layers 300C are arranged vertically and horizontally on the first subsidiary metal layer 300B but may be arranged in a zigzag pattern. According to the fifth embodiment configured as described above, an exposed metallic area forming each second subsidiary metal layer 300C is further smaller, compared to a case where the entire fourth container 46 is made of metal. Accordingly, even when an eddy current loop is generated on the metal layer group 301 due to the variations of the magnetic flux, the eddy current loop is minimized. Consequently, the generation of the Joule heat and eddy current losses caused by the eddy current are reduced. The above-described mesh pattern configuration on the radiation surface 46p of the fourth container 46 shown in FIG. 6 may be applied to the absorption surface 45i of the third container 45.

Figure 7:
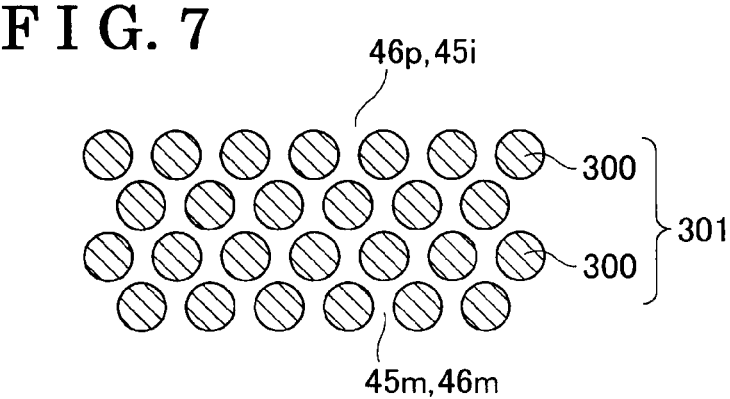
FIG. 7 is a partial developed view schematically showing the radiation surface and/or the absorption surface according to a sixth embodiment disclosed here.

FIG. 7 shows a sixth embodiment. The sixth embodiment basically includes similar configuration and operating effects to those of the first embodiment. FIG. 7 is a developed view schematically showing the radiation surface 46p of the fourth container 46 and/or the absorption surface 45 of the third container 45. As shown in FIG. 7, the metal layer group 301 includes the metal layers 300 divided from one another in a zigzag pattern and arranged side by side at intervals. The nonmetallic base material portion 46m and/or 45m is exposed between the first subsidiary metal layers 300 adjacent to one another. A vertically projected area of each metal layer 300 is a circular shape.

Figure 8:
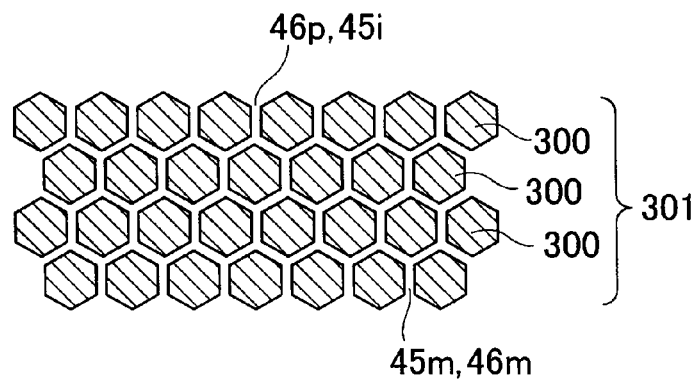
FIG. 8 is a partial developed view schematically showing the radiation surface and/or the absorption surface according to a seventh embodiment disclosed here.

FIG. 8 shows a seventh embodiment. FIG. 8 is a developed view schematically showing the radiation surface 46p and/or the absorption surface 45i. As shown in FIG. 8, the metal layer group 301 includes the multiple metal layers 300 divided from one another and arranged side by side at intervals. The nonmetallic base material portion 46m and/or 45m is exposed between the metal layers 300 adjacent to one another on the radiation surface 46p and/or the heat radiation surface 45i. A vertically projected area of each metal layer 300 is a hexagonal shape. In this case, an area ratio of the metal layers 300 in a unit area of the radiation surface 46p and/or the absorption surface 45i is larger than an area ratio of the base material portion 46m and/or 45m in the unit area of the radiation surface 46p and/or the absorption surface 45i.

Figure 9:
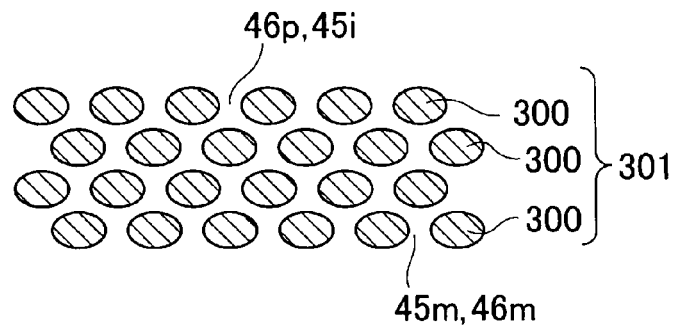
FIG. 9 is a partial developed view schematically showing the radiation surface and/or the absorption surface according to an eighth embodiment disclosed here.

FIG. 9 shows an eighth embodiment. FIG. 9 is a developed view schematically showing the radiation surface 46p and/or the absorption surface 45i. A vertically projected area of each of the metal layers 300 divided from one another and forming the metal layer group 301 is an oval shape.

Figure 10:
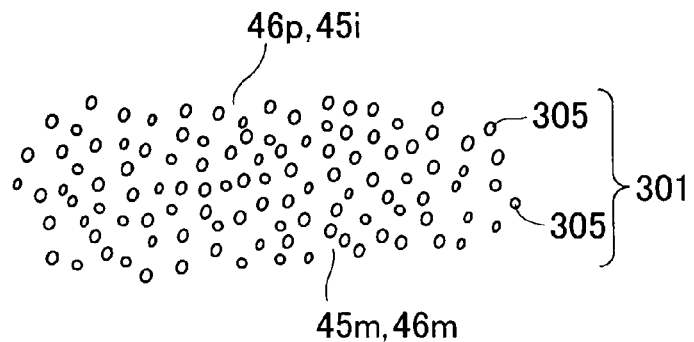
FIG. 10 is a partial developed view schematically showing the radiation surface and/or the absorption surface according to a ninth embodiment disclosed here.

FIG. 10 shows a ninth embodiment. FIG. 10 is a developed view schematically showing the radiation surface 46p and/or the absorption surface 45i. As shown in FIG. 10, multiple metallic particles (metal layers) 305 are applied to the radiation surface 46p and/or the absorption surface 45i by means of thermal spraying, adhesive bonding, or soldering, thereby forming the metal layer group 301. Some of the metallic particles 305 are connected to one another; however, most of the metallic particles 305 are basically separated from one another and arranged at intervals so that an eddy current loop may be minimized.

Figure 11:
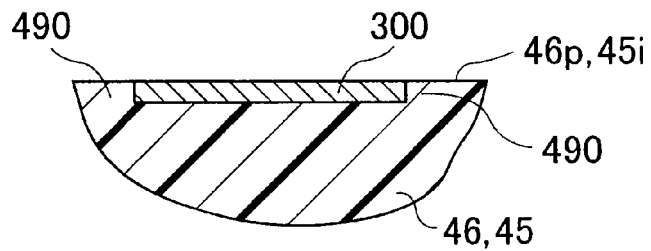
FIG. 11 is a partial developed view schematically showing the radiation surface and/or the absorption surface according to a tenth embodiment disclosed here.

FIG. 11 shows a tenth embodiment. As shown in FIG. 11, a convex engaging portion 490 is formed on the radiation surface 46p and/or the absorption surface 45i made of the nonmetallic material. The engaging portion 490 is mechanically engaged with each metal layer 300 forming the metal layer group 301. It is desirable for the engaging portion 490 to be continuously formed around an entire periphery of the metal layer 300. Even when a large magnetic force acts on the metal layer 300 because of a magnetic flux and an eddy current, the magnetic film 300 is prevented from being loosened from the radiation surface 46p and/or the absorption surface 45i by the engaging portion 490.

Figure 12:
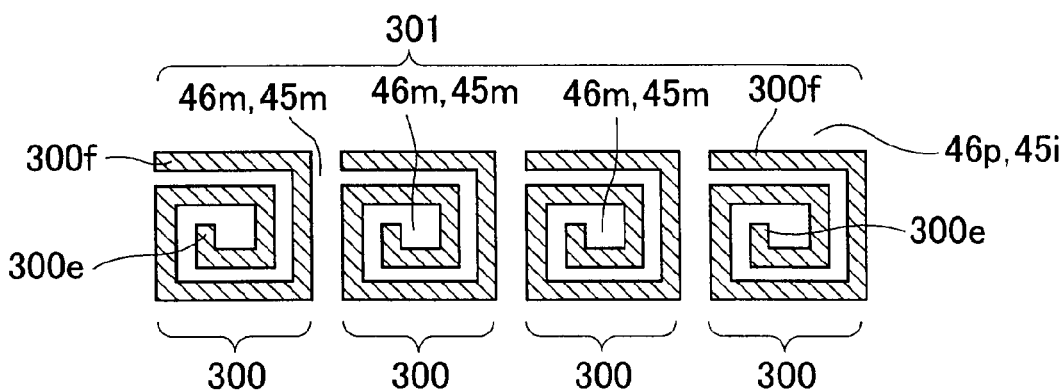
FIG. 12 is a partial developed view schematically showing the radiation surface and/or the absorption surface according to an eleventh embodiment disclosed here.

FIG. 12 shows an eleventh embodiment. FIG. 12 is a developed view schematically showing the radiation surface 46p and/or the absorption surface 45i. As shown in FIG. 12, each metal layer 300 including first and second ends 300f, 300e is formed in a long and thin shape so as to extend from the first end 300f to the second end 300e in a cornered scroll. That is, the metal layer 300 includes plural cornered portions that are bended in plural directions along the way from the first end 300f to the second end 300e. The first and second ends 300f, 300e are neither in contact with each other and nor electrically conductive to each other. In this case, an eddy current loop is minimized and an area ratio of the base material portion 46m and/or 45m in the radiation surface 46p and/or the absorption surface 45i is reduced, therefore reducing emissivity and absorption of thermal radiation at the radiation surface 46p and/or the absorption surface 45i.

Figure 13:
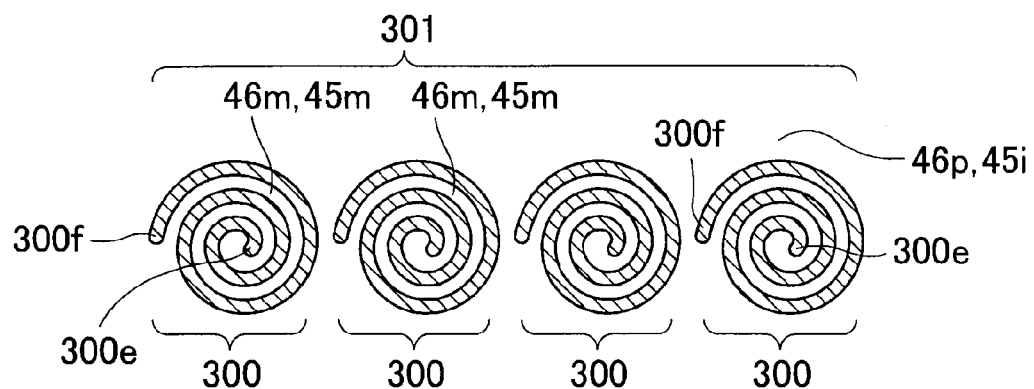
FIG. 13 is a partial developed view schematically showing the radiation surface and/or the absorption surface according to a twelfth embodiment disclosed here.

FIG. 13 shows a twelfth embodiment. FIG. 13 is a developed view schematically showing the radiation surface 46p and/or the absorption surface 45i. As shown in FIG. 13, each metal layer 300 including the first and second ends 300f, 300e is formed in a long and thin shape so as to extend from the first end 300f to the second end 300e in a scroll. The first and second ends 300f, 300e are not in contact with each other. In this case, an eddy current loop is minimized and the area of the base material portion 46m and/or 45m in the radiation surface 46p and/or the absorption surface 45i is reduced, therefore reducing emissivity and absorption of thermal radiation at the radiation surface 46p and/or the absorption surface 45i.

Figure 14:
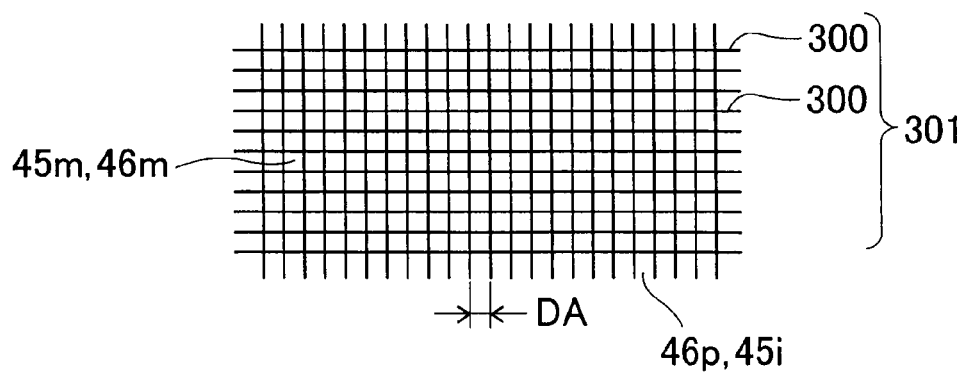
FIG. 14 is a partial developed view schematically showing the radiation surface and/or the absorption surface according to a thirteenth embodiment disclosed here.

FIG. 14 shows a thirteenth embodiment. FIG. 14 is a developed view schematically showing the radiation surface 46p and/or the absorption surface 45i. As shown in FIG. 14, the metal layer group 301 includes the metal layers 300 extending in thin and long linear shapes and arranged in a net-like pattern. In this condition, the metal layers 300 are exposed on the radiation surface 46p and/or the absorption surface 45i, therefore reducing the area of the nonmetallic base material portion 46m and/or 45m in the radiation surface 46p and/or the absorption surface 45i. Accordingly, emissivity and absorption of thermal radiation at the radiation surface 46p and/or the absorption surface 45i are reduced and the occurrence of thermal radiation is inhibited. Further, since the base material portion 46m and/or 45m is exposed on the radiation surface 46p and/or the absorption surface 45i, continuity of the metal layers 300 is reduced and an electric resistance of the metal layer group 301 is increased, thereby preventing the generation of an eddy current.

A distance DA between the metal layers 300 linearly arranged may be determined according to need. For example, the distance DA is set to be between 1 micrometer and 10 millimeters or between 10 micrometers and 5 millimeters accordingly. When the distance DA is long, the metal layers 300 are formed by means of a usual manufacturing process of meshes. When the distance DA is short, the metal layers 300 are formed by means of a fine processing technology such as dry etching, wet etching, and wire bonding processes. When the distance DA is shorter than an infrared wavelength range, infrared rays do not easily penetrate through the metal layer group 301 on the radiation surface 46p and/or the radiation surface 45i, thereby increasing a shielding performance of the metal layers 300 relative to the infrared ray radiation. In addition, the infrared wavelength range is generally from 1 micrometer to 1,000 micrometers.

Figure 15:
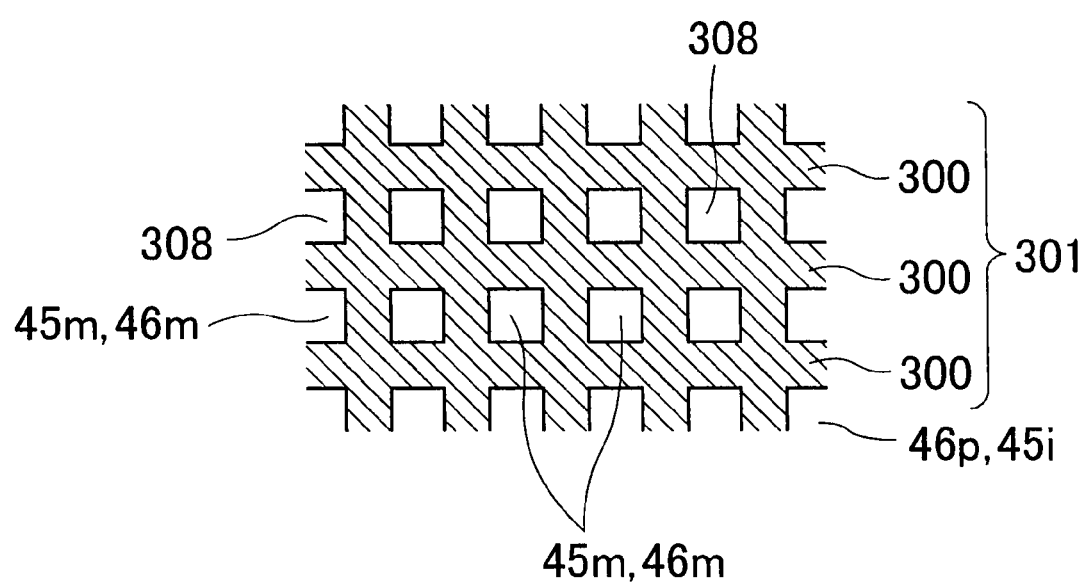
FIG. 15 is a partial developed view schematically showing the radiation surface and/or the absorption surface according to a fourteenth embodiment disclosed here.

FIG. 15 shows a fourteenth embodiment. FIG. 15 is a developed view schematically showing the radiation surface 46p and/or the absorption surface 45i. As shown in FIG. 15, the metal layer group 301 includes a sheet-like punching metal having the metal layers 300 in which multiple through-holes 308 formed by a punching process are sectionalized. The nonmetallic base material portion 46m and/or 45m is exposed in the through-holes 308 on the radiation surface 46p and/or the absorption surface 45i. Accordingly, continuity of the metal layers 300 is reduced. That is, some portions among the metal layers 300 are connected to one another while other portions are separated from one another by the through-holes 308. Consequently, the electric conductivity of the metal layers 300 increases and the generation of an eddy current is reduced. Further, since the metal layers 300 are exposed on the radiation surface 46p and/or the absorption surface 45i, the area of the nonmetallic base material portion 46m and/or 45m is decreased and emissivity and absorption of thermal radiation are reduced at the radiation surface 46p and/or the absorption surface 45i.

Figure 16:
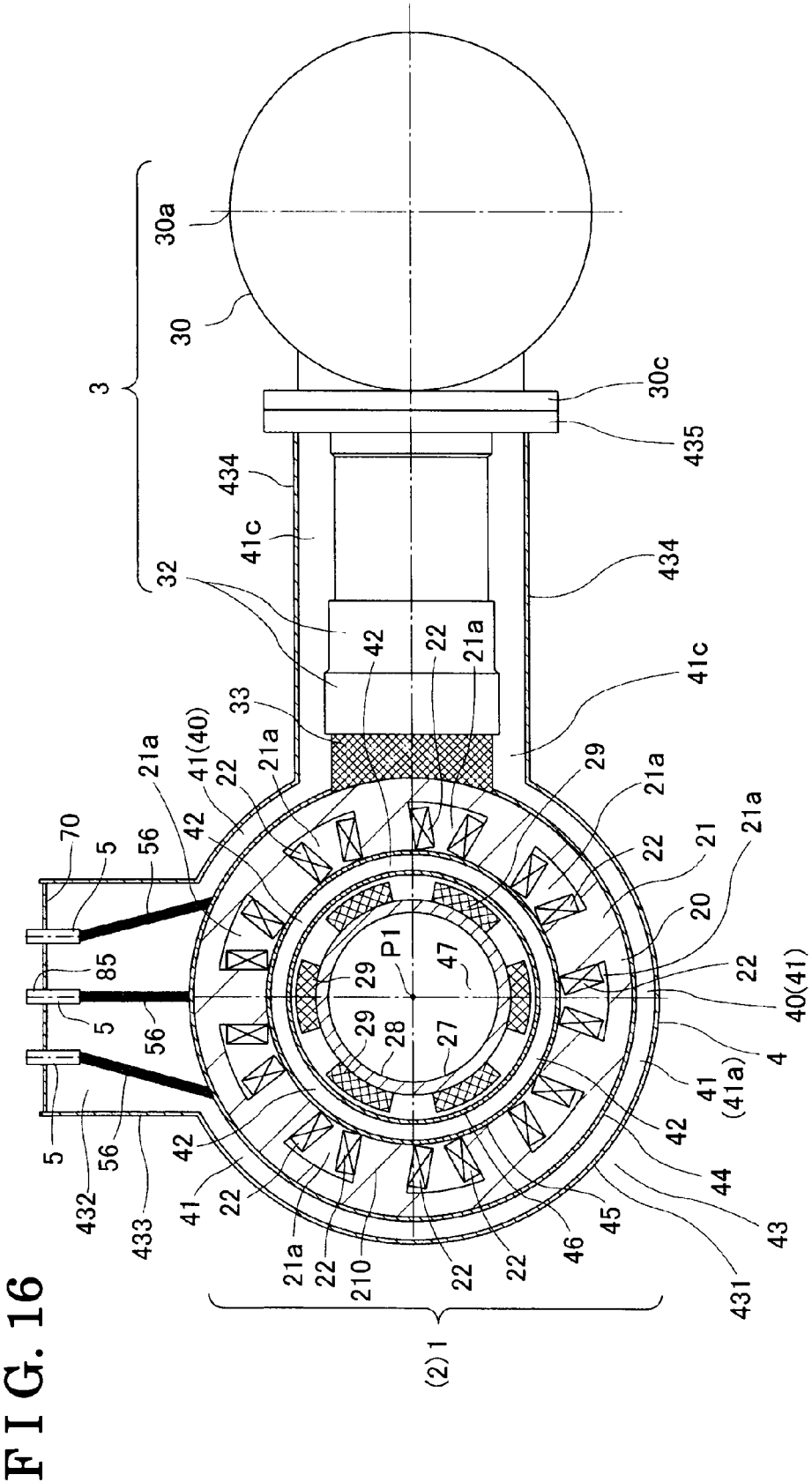
FIG. 16 is a partial developed view schematically showing the radiation surface and/or the absorption surface according to a fifteenth embodiment disclosed here.
Figure 17:
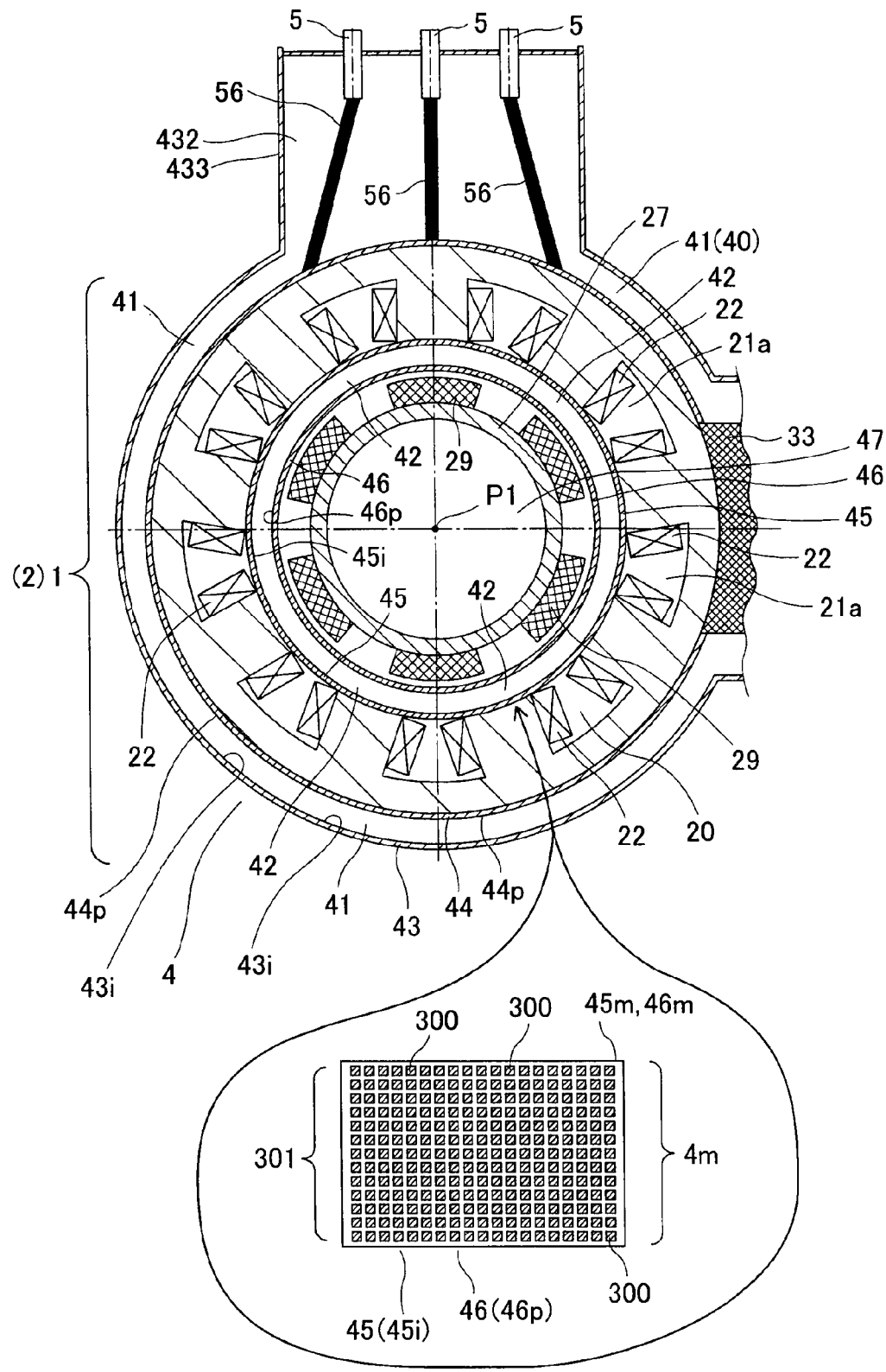
FIG. 17 is a partial cross-sectional view of a superconducting apparatus according to the fifteenth embodiment disclosed here.

FIG. 16 and FIG. 17 show a fifteenth embodiment. The fifteenth embodiment is applied to a superconducting motor device 1, which is an example of a magnetic field generator serving as a representative example of the superconducting apparatus. The superconducting motor device 1 may be used in a vehicle, in a stationary state, for an industrial purpose, and the like. The superconducting motor device 1 includes a superconducting motor 2 serving as a magnetic field generating portion, an extremely low temperature generating portion 3, the vacuum container 4, and electric current lead-in terminals 5 (hereinafter simply referred to as lead-in terminals 5).

The superconducting motor 2 serves as a motor to which a three-phase alternating current is supplied. The three phases are different from one another by 120 degrees each. The superconducting motor 2 includes a stator 20 having a cylindrical shape around an axial center P1 of the superconducting motor 2 and a rotor 27 serving as a mover rotatable relative to the stator 20. The rotor 27 includes a rotational shaft 28 rotatably supported about the axial center P1 of the superconducting motor 2 and multiple permanent magnet portions 29 arranged at equal intervals at an outer peripheral portion of the rotational shaft 28. The permanent magnet portions 29 are formed by known permanent magnets.

The stator 20 includes a stator core 21 and a superconducting coil 22. The stator core 21 is formed into a cylindrical shape by a material having a high magnetic permeability while serving as a permeable core. The superconducting coil 22 is wound on the stator core 21 and held thereat. The superconducting coil 22 is divided into three portions so that the three-phase alternating current can be supplied. The superconducting coil 22 is formed by a known superconducting material. The superconducting coil 22 is arranged within throttle grooves 21a formed in an inner peripheral portion of the stator core 21. In a case where the three-phase alternating current is supplied to the superconducting coil 22, a rotational magnetic field is generated, rotating around the stator 20, i.e., the axial center P1 of the superconducting motor 2. The rotor 27 rotates about the axial center P1 by means of the rotational magnetic field, thereby obtaining a motor function.

The extremely low temperature generating portion 3 maintains the superconducting coil 22 at an extremely low temperature so as to retain a superconducting state of the superconducting coil 22. An extremely low temperature range obtained by the extremely low temperature generating portion 3 is selected depending on a material of the superconducting material that constitutes the superconducting coil 22. The temperature range may be equal to or smaller than a helium liquefaction temperature or equal to or smaller than a nitrogen liquefaction temperature. For example, the temperature range is equal to 0 to 150K, specifically, 1 to 100K or 1 to 80K. At this time; however, the temperature range is not limited to such values and is dependent on the superconducting material forming the superconducting coil 22. The extremely low temperature generating portion 3 includes a refrigerator 30 having a cold head 32 where the extremely low temperature is generated, and a conductive portion 33 having a temperature conductive material as a base material for connecting the cold head 32 of the refrigerator 30 to the stator core 21 of the stator 20 of the superconducting motor 2. A known refrigerator such as a pulse tube refrigerator, Stirling refrigerator, Gifford-McMahon refrigerator, Solvay refrigerator, and Vuilleumier refrigerator is used as the refrigerator 30. The conductive portion 33 is made of a material having a high temperature conductivity such as copper alloy, aluminum, and aluminum alloy.

As illustrated in FIG. 16, the vacuum container 4 includes a vacuum heat insulation chamber 40 serving as a decompressed heat insulation chamber for heat-insulating the superconducting coil 22. At this time, the term "vacuum" corresponds to a decompressed state in which heat insulation is achieved. The vacuum heat insulation chamber 40 of the vacuum container 4 includes the outer vacuum heat insulation chamber 41 (temperature: for example, 70K to 350K; pressure: for example, $10^{-2}$ Pa or less) and the inner vacuum heat insulation chamber 42 (temperature: for example, 70K to 350K; pressure: for example, 10–2 Pa or less). The outer vacuum heat insulation chamber 41 covers an outer peripheral side (outer side) of the superconducting coil 22 wound on the stator 20 and held thereby and an outer peripheral side (outer side) of the stator 20. The inner vacuum heat insulation chamber 42 covers an inner peripheral side (inner side) of the superconducting coil 22 and an inner peripheral side (inner side) of the stator 20. The vacuum heat insulation chamber 40 is maintained in a high vacuum state (i.e., in a state decompressed relative to an atmospheric pressure) upon shipment. The vacuum heat insulation chamber 40 is desirably maintained in the high vacuum state over a long period of time.

Since the superconducting coil 22 is covered by both the outer vacuum heat insulation chamber 41 and the inner vacuum heat insulation chamber 42, the superconducting coil 22 is maintained in an extremely low temperature state, and further in a superconducting state. As illustrated in FIG. 16, the outer vacuum heat insulation chamber 41 includes a first insulation chamber portion 41a covering an outer peripheral portion of the stator 20 and a second insulation chamber portion 41c covering outer peripheral portions of the conductive portion 33 and the cold head 32. The second insulation chamber portion 41c covers the conductive portion 33 and the cold head 32 to thereby maintain them at a low temperature.

As shown in FIG. 16, the vacuum container 4 includes the first container 43, the second container 44, the third container 45, and the fourth container 46 in order from the radially outer side to the radially inner side. The first to fourth containers 43 to 46 are coaxially arranged with one another. The first container 43 and the second container 44 face each other in a radial direction of the stator core 21 so as to define the outer vacuum heat insulation chamber 41. The third container 45 and the fourth container 46 face each other in the radial direction of the stator core 21 so as to define the inner vacuum heat insulation chamber 42.

The rotor 27 is rotatably arranged in the void 47 having a cylindrical shape defined by the fourth container 46. The void 47 is connected to the outer atmosphere. The rotor 27 is connected to a rotating operation member, which is a wheel, for example, in a case where the superconducting motor device 1 is mounted on a vehicle such as an automobile. In such case, when the rotor 27 rotates, the wheel rotates accordingly.

As shown in FIG. 16, the first container 43 includes a first cover portion 431, a guide portion 433, a second cover portion 434, and an attachment flange portion 435. The first cover portion 431 having a cylindrical shape covers an outer peripheral portion of the superconducting motor 2. The guide portion 433 defines a guide chamber 432 for guiding three-phase electric current lead-in wires 56 (which will be hereinafter referred to as lead-in wires 56) that supply an electric power to the superconducting coil 22. The second cover portion 434 covers the cold head 32 and the conductive portion 33. A flange 30c of a compression mechanism 30a that compresses a refrigerant gas in the refrigerator 30 is attached to the attachment flange portion 435. The guide portion 433 is formed so as to project from the first cover portion 431 that covers the superconducting motor 2. An outer side of the first container 43 may be exposed to the outer atmosphere but not limited thereto. The outer side of the first container 43 may be covered by an insulation material.

The first container 43 is made of a material desirably having a strength and through which leakage flux does not penetrate or is difficult to penetrate. A nonmagnetic metal having a low permeability such as an alloy steel material, i.e., an austenitic stainless steel material, is used for the material of the first container 43, for example. Each of the second, third, and fourth containers 44, 45, and 46 is made of a material desirably having a high electric resistance so that a magnetic flux may penetrate through the second, third and fourth containers 44, 45, and 46 but so as to restrain an eddy current generated by variations of the magnetic flux. A nonmetallic material such as resin, reinforced resin for a reinforcing material, and ceramic is used for the material forming the second to fourth containers 44, 45 and 46. The reinforcing material is a mineral material such as glass and ceramic, for example. The reinforcing material is desirably a reinforced fiber and is an inorganic fiber such as a glass fiber and a ceramic fiber. The resin may be either a thermosetting resin or a thermoplastic resin.

As illustrated in FIG. 16, a fixed board 70 serving as a first holding portion is fixed to an upper end of the guide portion 433 that has a cylindrical shape and that projects from a portion of the first container 43. The fixed board 70 is made of a material having a high heat insulation and/or difficulty in permeation of leakage flux. For example, resin, reinforced resin for a reinforcing material, and ceramic may be used for the material forming the fixed board 70. A nonmagnetic metallic material having a low permeability may be used for the material as the need may be. In such case, an electric insulation structure is desirably applied to each of the lead-in terminals 5. Further, the guide chamber 432 is connected to the outer vacuum heat insulation chamber 41. Thus, in a case where the superconducting motor 2 is driven, the guide chamber 432 is in the vacuum insulation state (i.e., decompressed heat insulation state). The guide chamber 432 exercises the heat insulation function to thereby maintain the lead-in terminals 5 at the low temperature. As shown in FIG. 16, the multiple (three) lead-in terminals 5 are electrically connected to the superconducting coil 22 via the respective lead-in wires 56. The lead-in terminals 5 include a conductive material as a main material through which an electric power is supplied to the superconducting coil 22. The lead-in terminals 5 are fixedly supported by the fixed board 70 provided at the upper end of the guide portion 433 of the first container 43.

A structure for fixing the lead-in terminals 5 to the fixed board 70 is not specifically determined. According to the fifteenth embodiment, as illustrated in FIG. 16, the lead-in terminals 5 are approximately coaxially inserted into respective through-holes formed in the fixed board 70. A seal member is disposed between an inner wall surface of each of the first through-holes and an outer wall surface of each of the lead-in terminals 5 so as to increase air tightness therebetween. Accordingly, the guide chamber 432 is sealed relative to the outer atmosphere outside of the vacuum container 4 and the high vacuum state (decompressed state) of the guide chamber 432 is maintained. As illustrated in FIG. 16, first ends of the lead-in terminals 5 are accommodated within the guide chamber 432 while second ends of the lead-in terminals 5 are positioned so as to protrude out of the guide chamber 432. A material forming the lead-in terminals 5 is not specifically defined as long as the material is conductive. For example, copper, copper alloy, aluminum, aluminum alloy, iron, iron alloy, silver, or silver alloy may be used for the material forming the lead-in terminals 5.

When a changing-over switch arranged at an exterior portion of the vacuum container 4 is turned on for driving the superconducting motor 2, the three-phase alternating current is supplied to the lead-in terminals 5 connected to an external electric power source and then supplied to the superconducting coil 22. As a result, the rotational magnetic field is generated around the axial center P1 of the superconducting motor 2, thereby rotating the rotor 27 about the rotational center P1. The superconducting motor 2 is driven accordingly. Here, the magnetic flux penetrates through the third container 45, the inner vacuum heat insulation chamber 42, and the fourth container 46, thereby generating an attraction force and a repelling force at the permanent magnet portions 29 of the rotor 27. The rotor 27 rotates accordingly.

When the superconducting motor 2 is driven as described above, the superconducting coil 22 and the stator core 21 are maintained in the extremely low temperature that is generated by the extremely low temperature generating portion 3. Thus, the superconducting state of the superconducting coil 22 is desirably maintained under a critical temperature or lower, therefore generating an excellent rotational driving of the superconducting motor 2. Since the electric resistance of the superconducting coil 22 is equal to zero or extremely low, the output of the superconducting motor 2 is high. The superconducting coil 22 is wound around the teeth portions 210 protruding in a radially inward direction of the stator core 21. According to the fifteenth embodiment, since the void 47 defined by the inner circumferential surface of the fourth container 46 is connected to the outer atmosphere, the fourth container 46 is arranged in an area where a temperature is higher than an area in which the third container 45 is arranged. Since the third container 45 is provided adjacent the superconducting coil 22, the third container 45 is positioned at the low temperature side. The outer circumferential surface of the fourth container 46 serves as the radiation surface 46p facing the third container 45 via the inner vacuum heat insulation chamber 42. The inner circumferential surface of the third container 45 serves as the absorption surface 45i facing the radiation surface 46p of the fourth container 46 via the inner vacuum heat insulation chamber 42. Here, it is appropriate that thermal radiation from the fourth container 46 at the high temperature side to the third container 45 at the low temperature side is shielded as much as possible in order to maintain the low temperature state of the superconducting coil 22.

According to the fifteenth embodiment, the metal layer group 301 is laminated in the flux transmission area 4m of the radiation surface 46p of the fourth container 46 at the high temperature side as shown in FIG. 17. Meanwhile, the metal layer group 301 is laminated in the flux transmission area 4m of the absorption surface 45i of the third chamber 45 at the low temperature side. Accordingly, emissivity and absorption of thermal radiation from the fourth chamber 46 at the high temperature side to the third container 45 at the low temperature side through the inner vacuum heat insulation chamber 42 are reduced as much as possible.

Basically having similar configuration and operating effects to the fifteenth embodiment, a sixteenth embodiment will be explained with reference to FIG. 16 and FIG. 17. The inner circumferential surface 43i of the first container 43 is arranged close to the outer atmosphere, therefore being positioned at a high temperature side. The metal layer group 301 is laminated to the inner circumferential surface 43i. The outer circumferential surface 44p of the second container 44 is arranged close to the superconducting coil 22, therefore being positioned at a low temperature side. The metal layer group 301 is laminated to the outer circumferential surface 44p. Accordingly, emissivity and absorption of thermal radiation from the inner circumferential surface 43i of the first container 43 at the high temperature side to the outer circumferential surface 44p of the second container 44 at the low temperature side through the outer vacuum heat insulation chamber 41 are reduced as much as possible. Similarly to the fifteenth embodiment, the metal layer group 301 is laminated to the radiation surface 46p of the fourth container 46 and the metal layer group 301 is laminated to the absorption surface 45i of the third container 45.

Figure 18:
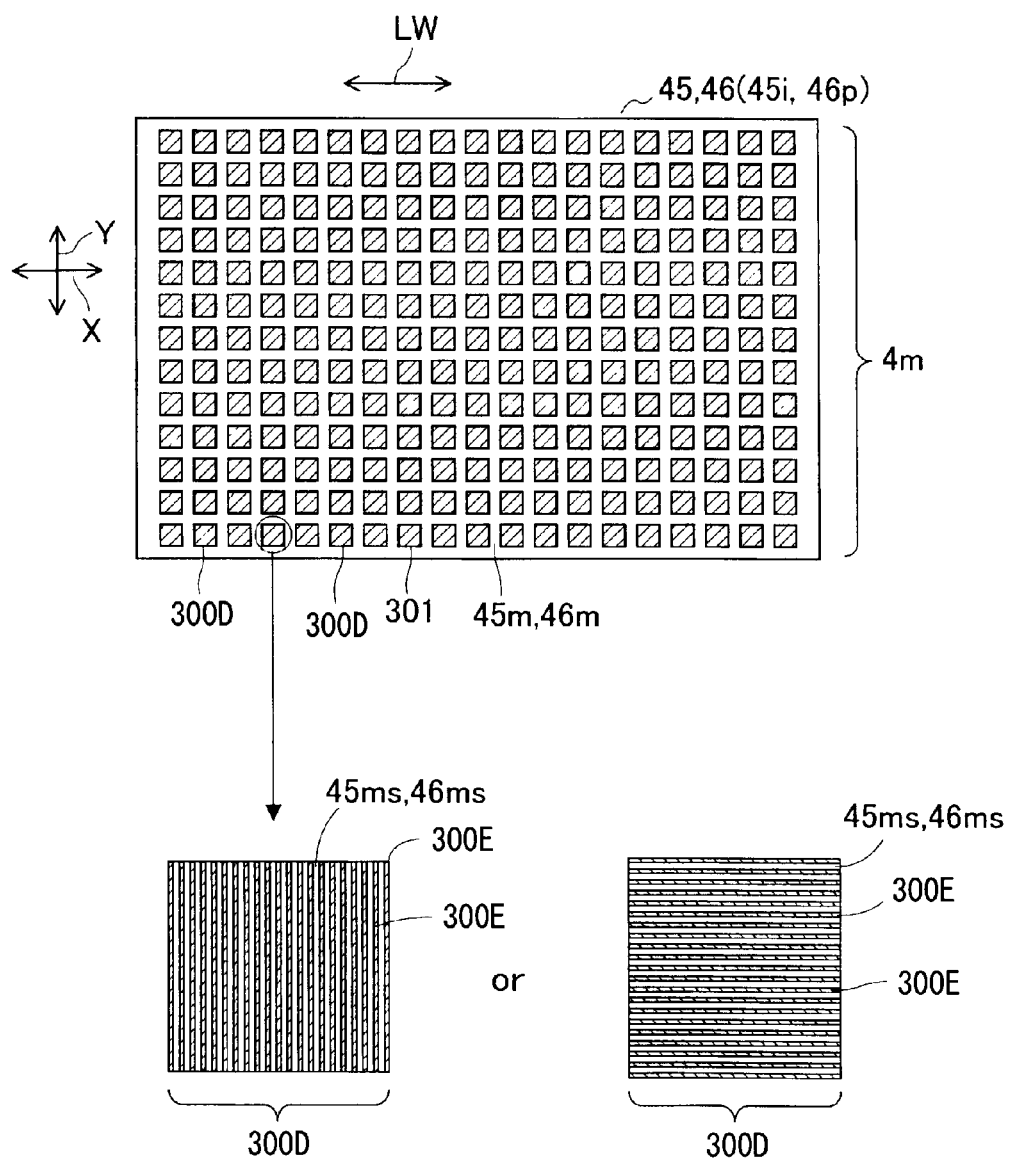
FIG. 18 is a partial developed view schematically showing the radiation surface and/or the absorption surface according to a seventeenth embodiment disclosed here.

FIG. 18 shows a seventeenth embodiment basically having similar configuration and operating effects to those of the first embodiment. As shown in FIG. 18, the metal layer group 301 includes multiple first subsidiary metal layers 300D laminated to the radiation surface 46p and arranged side by side at intervals vertically and horizontally. The first subsidiary metal layers 300D may be arranged in a zigzag pattern on the radiation surface 46p. Further, each of the first subsidiary metal layers 300D includes multiple second subsidiary metal layers 300E divided from one another and extending linearly and longitudinally. The first subsidiary metal layers 300D are arranged in the flux transmission area 4m so as to intersect with a direction in which the second subsidiary metal layers 300E extend. The nonmetallic base material portion 46m (made of such as resin, fiber-reinforced resin, and ceramic) forming the fourth container 46 are exposed vertically and horizontally between the first subsidiary metal layers 300D adjacent to one another on the radiation surface 46p. The second subsidiary metal layers 300E may extend in either an X direction or a Y direction shown in FIG. 18. Furthermore, the nonmetallic base material portion 46ms (made of materials such as resin, fiber-reinforced resin, and ceramic) forming the fourth container 46 are exposed between the second subsidiary metal layers 300E arranged side by side vertically and horizontally with one another. The second subsidiary metal layers 300 E are finely divided by the nonmetallic base material portion 46ms exposed on the radiation surface 46p, and arranged vertically or horizontally thereon, thereby minimizing an eddy current loop. Meanwhile, the absorption surface 45i of the third container 45 is configured in the same way as the radiation surface 46p of the fourth container 46. The second subsidiary metal layers 300 E are finely divided by the nonmetallic base material portion 45ms exposed on the absorption surface 45i, and arranged vertically or horizontally thereon, thereby minimizing an eddy current loop. In addition, the eddy current flows in a direction perpendicular to a magnetic flux while forming a loop. Accordingly, the vertical or horizontal alignment of the second subsidiary metal layers 300E easily interrupts the loop. In other words, as far as the multiple second subsidiary metal layers 300E are arranged side by side at intervals in a condition where the base material portions 46ms, 45ms are exposed between the second subsidiary metal layers 300E, any alignment may be applicable to the second subsidiary metal layers 300E.

An eighteenth embodiment will be explained below. According to the aforementioned fifteenth embodiment, the rotor 27 includes the rotational shaft 28 rotatably supported around the axial center P1 and the multiple permanent magnet portions 29 arranged at the outer peripheral portion of the rotational shaft 28 having intervals in the peripheral direction; however, a configuration of the rotor 27 is not limited to such configuration. Alternatively, the permanent magnet portions may be provided at the stator 20 and the superconducting coil 22 may be provided at the rotor 27. According to the aforementioned fifteenth embodiment, the superconducting motor device 1 is mounted on the vehicle but may be used in a stationary state. In addition, according to the aforementioned fifteenth embodiment, the rotor 27 serves as the mover because the superconducting motor device 1 is a rotatably operating type. Alternatively, the superconducting motor device 1 may be a directly operating linear motor for directly operating the mover. In this case, the stator 20 is formed extending in one direction to generate a movable magnetic field to thereby directly operate the mover.

According to the aforementioned fifteenth embodiment, the rotor 27 includes the permanent magnet portions 29 while the stator 20 includes the stator core 21 and the superconducting coil 22 wound on the stator core 21 and held thereby. Alternatively, the stator 20 may include permanent magnet portions 29 and the rotor 27 may include the superconducting coil 22. Further, the teeth portions 210 are configured to project in the radially inward direction or a radially outward direction of the stator core 21 depending on the type of a superconducting motor device.

Further, the superconducting apparatus is not limited to the superconducting motor device 1. For example, the superconducting apparatus according to the fifteenth embodiment is applicable to a magnetic field generator including a permeable core and an extremely low temperature generating portion for cooling a superconducting coil so as to generate a magnetic field. A superconducting sputtering apparatus, a magnetic resonance imaging device (MRI), a nuclear magnetic resonator (NMR), or a magnetic shield device is applicable to the magnetic field generator. In other words, a device or an apparatus including the superconducting coil and the extremely low temperature generating portion cooling the superconducting coil is applicable to the superconducting apparatus. A specific structure or function for one of the aforementioned first to eighteenth embodiments may be applicable to the other of those embodiments according to need as long as not departing from the sum of the embodiments.

The superconducting apparatus according to the aforementioned first to eighteenth embodiments may be applicable, for example, for industrial purpose, and may be mounted on a vehicle or used for a superconducting apparatus for a medical application.

As described above, in the vacuum container 4 for the superconducting apparatus, an area ratio of the nonmetallic material is decreased and an area ratio of the metal layers 300 is increased at least one of the radiation surface 46*p* of the fourth container 46 and the absorption surface 45*i* of the third container 45. As a result, the emissivity of thermal radiation of the radiation surface 46*p* and/or the absorption of the absorption surface 45*i* is decreased. Consequently, thermal radiation relative to the superconducting coil 22 is minimized and the superconducting apparatus is prevented from being heated.

In addition, according to the vacuum container 4 for the superconducting apparatus, the vacuum heat insulation chambers 41, 42 are maintained in the high vacuum state (depressurized state) that is equal to or smaller than $10^{-2}$ Pa, equal to or smaller than $10^{-5}$ Pa, and the like. However, the high vacuum state is not limited to the aforementioned state. The vacuum heat insulation chambers 41, 42 may be maintained in a vacuumed state without being constantly suctioned by a vacuum pump. The superconductor may be a superconducting coil electrically fed to thereby generate a magnetic field, a superconducting bulk magnet generating a magnetic flux without an electrical feeding, and the like. The superconducting bulk magnet is produced by a melt-textured growth process. The superconducting bulk magnet is desirably formed by ceramic consisting mainly of RE-Ba—Cu—O (RE includes one or two of Y, La, Nd, Sm, Eu, Gd, Er, Yb, Dy, and Ho). In this case, a parent phase exhibiting a superconductive state is composed of finely separated insulating layers. The insulating layers act as flux pinning points, thereby realizing superconductivity having a large supplemental magnetic field.

According to aforementioned embodiments, one of the metal layers 300 is formed of a material selected from the group consisting of the thin metallic film, the metallic foil, the metal tape, the metal film, the metal strip, the metal grain, the punching metal, and the metal mesh body According to aforementioned embodiments, the nonmetallic material appears as the mesh pattern between the metal layers 300 adjacent to one another on one of the radiation surface 46*p* of the fourth container 46 and the absorption surface 45*i* of the third container 45.

Accordingly, the continuity of the metal layers 300 is reduced and the electric resistance of the metal layer group 301 is increased, thereby preventing the generation of an eddy current.

According to the aforementioned embodiments, the metal layer group 301 includes the multiple first subsidiary metal layers 300B, 300D spaced apart from one another and the nonmetallic material appears between the first subsidiary metal layers 300B, 300D. Further, each of the first subsidiary metal layers 300B, 300D includes the multiple second subsidiary metal layers 300C, 300E spaced apart from one another and the nonmetallic material appears between the multiple second subsidiary metal layers 300C, 300E.

Accordingly, the continuity between the second subsidiary metal layers 300C, 300E is reduced and the electric resistance of the metal layer group 301 is increased, thereby preventing the generation of an eddy current.

According to the aforementioned embodiments, the magnetic field generating portion includes the superconducting motor 2 having the stator 20 and the rotor 27 movable relative to the stator 20, and the superconductor configuring the superconducting coil 22 is provided at one of the stator 20 and the rotor 27.

According to the aforementioned embodiments, the extremely low temperature generating portion 3 maintaining the superconducting coil 22 at the extremely low temperature in order to maintain the superconducting coil 22 in the superconductive state.

The extremely low temperature falls within a range equal to or smaller than a critical temperature at which the superconducting coil 22 shows the superconducting state. Thus, the temperature range differs depending on the critical temperature and composition of the superconducting coil 22. In practice, the temperature range is desirably equal to or smaller than a liquefaction temperature of nitrogen gas (77K). However, depending on the composition of the superconducting coil 22, the temperature range may be equal to or smaller than 100K, or equal to or smaller than 150K. The extremely low temperature generating portion may be a refrigerator, a temperature conductive mechanism transmitting the low temperature from the refrigerator to the superconducting motor, a mechanism maintaining an extremely low temperature state of a cooling medium to be thermally insulated without installation of a refrigerator, and the like.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vacuum container for housing therein a superconducting apparatus, comprising:
   first and second partition walls made of magnetic-permeable nonmetallic materials, respectively, and facing each other to form a vacuum heat insulation chamber that is adapted to cover a superconductor that generates a magnetic flux, the first and second partition walls being exposed to relatively higher and lower temperatures, respectively, the first partition wall including a radiation surface emitting thermal radiation, the second partition wall including an absorption surface absorbing the thermal radiation,
   wherein one of the radiation surface of the first partition wall and the absorption surface of the second partition wall is provided with a metal layer group in an exposed manner relative to the other of the radiation surface of the first partition wall and the absorption surface of the second partition wall, and the metal layer group includes a plurality of metal layers spaced apart from one another and the nonmetallic material appears between the plurality of metal layers.

2. The vacuum container according to claim 1, wherein one of the metal layers is formed of a material selected from the group consisting of a thin metallic film, a metallic foil, a metal tape, a metal film, a metal strip, a metal grain, a punching metal, and a metal mesh body.

3. The vacuum container according to claim 1, wherein the nonmetallic material appears as a mesh pattern between the metal layers adjacent to one another on one of the radiation surface of the first partition wall and the absorption surface of the second partition wall.

4. The vacuum container according to claim 1, wherein the metal layer group includes a plurality of first subsidiary metal layers spaced apart from one another and the nonmetallic material appears between the first subsidiary metal layers, and wherein each of the first subsidiary metal layers includes a plurality of second subsidiary metal layers spaced apart from one another and the nonmetallic material appears between the plurality of second subsidiary metal layers.

5. A superconducting apparatus, comprising:
   a magnetic field generating portion including a superconductor that generates a magnetic flux and a permeable core that allows penetration of the magnetic flux generated by the superconductor; and
   a vacuum container including first and second partition walls made of magnetic-permeable nonmetallic materials, respectively, and facing each other to form a vacuum heat insulation chamber that is adapted to cover the superconductor, the first and second partition walls being exposed to relatively higher and lower temperatures, respectively, the first partition wall including a radiation surface emitting thermal radiation, the second partition wall including an absorption surface absorbing thermal radiation,
   wherein one of the radiation surface of the first partition wall and the absorption surface of the second partition wall is provided with a metal layer group in an exposed manner relative to the other of the radiation surface of the first partition wall and the absorption surface of the second partition wall, and the metal layer group includes a plurality of metal layers spaced apart from one another and the nonmetallic material appears between the plurality of metal layers.

6. The superconducting apparatus according to claim 5, wherein the magnetic field generating portion includes a superconducting motor having a stator and a mover movable relative to the stator, and the superconductor configuring a superconducting coil is provided at one of the stator and the mover.

7. The superconducting apparatus according to claim 5, further comprising an extremely low temperature generating portion maintaining the superconducting coil at an extremely low temperature in order to maintain the superconducting coil in a superconducting state.

* * * * *